Dec. 24, 1940.  S. C. HART-STILL  2,225,779
AIRCRAFT WING CONSTRUCTION
Filed April 22, 1938  3 Sheets-Sheet 1
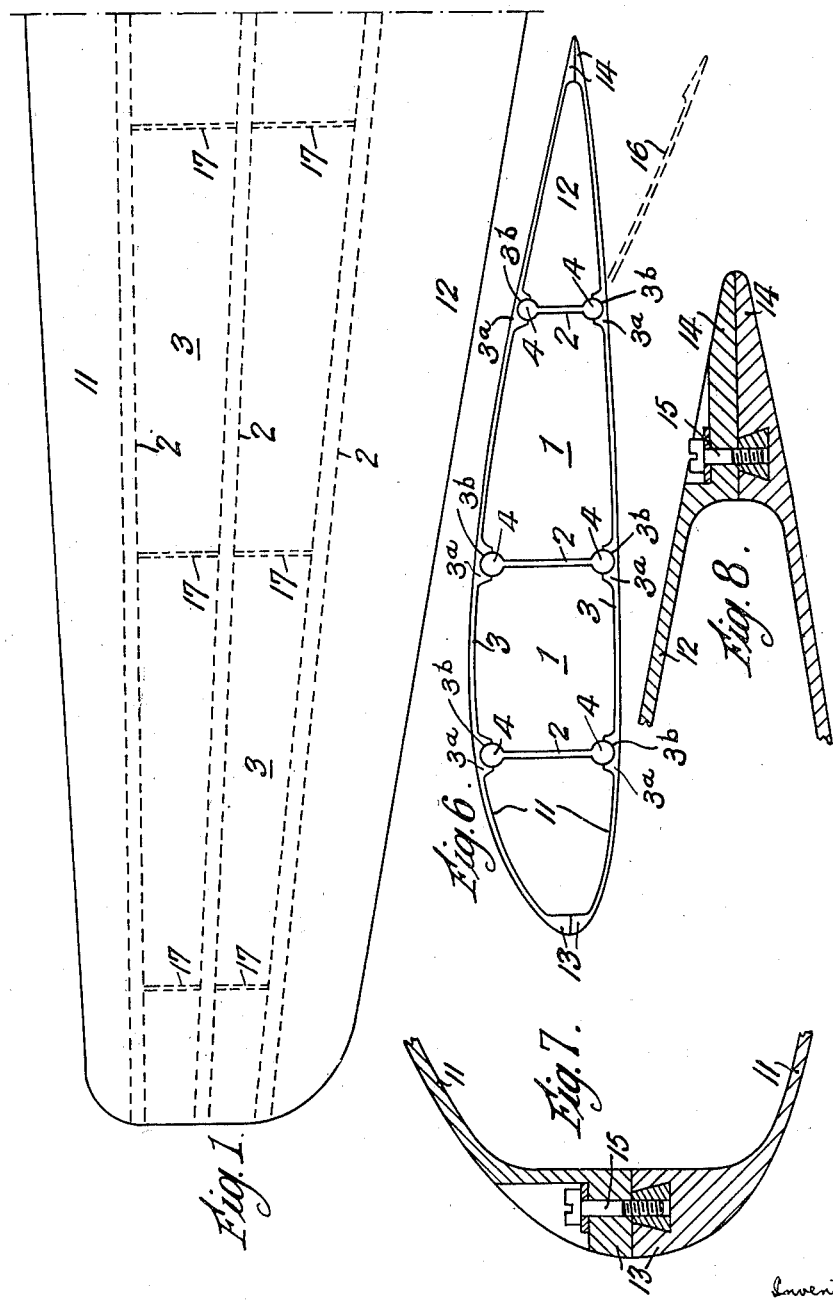

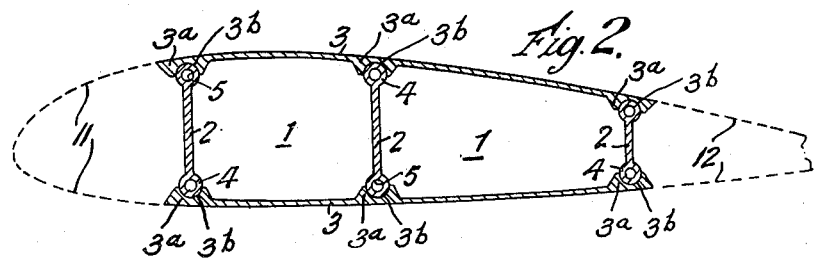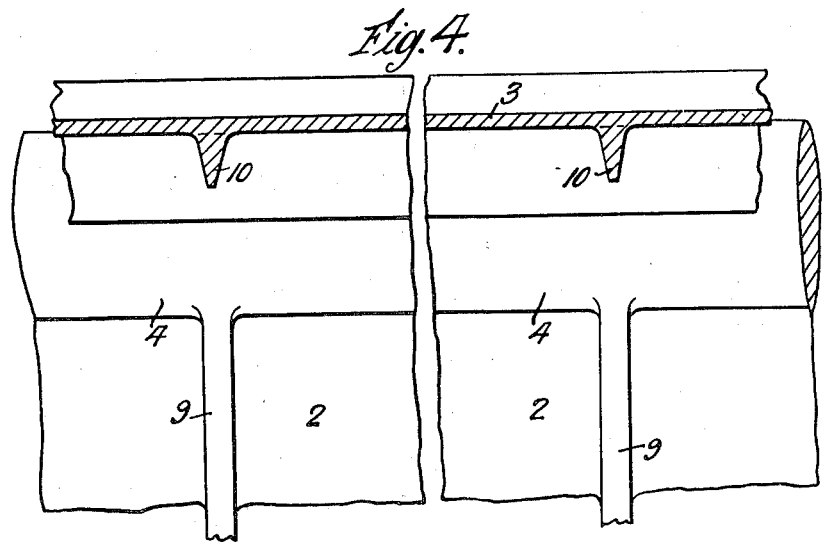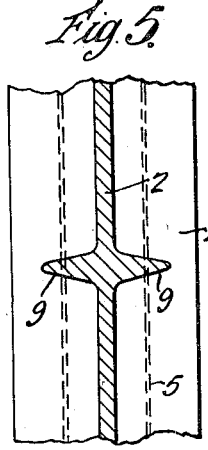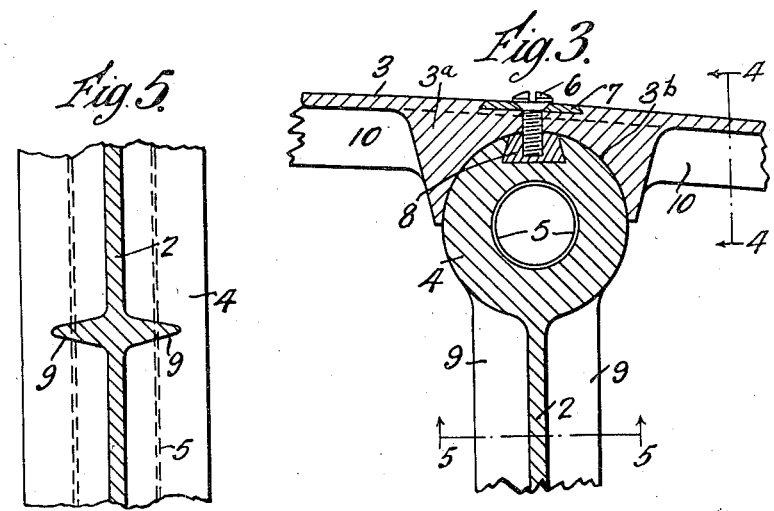

Dec. 24, 1940.    S. C. HART-STILL    2,225,779
AIRCRAFT WING CONSTRUCTION
Filed April 22, 1938    3 Sheets-Sheet 3
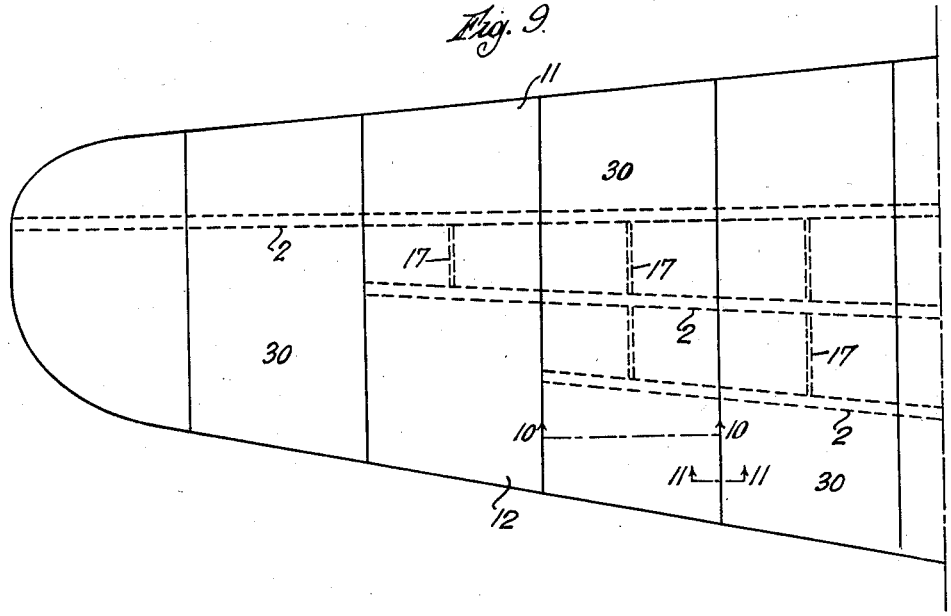
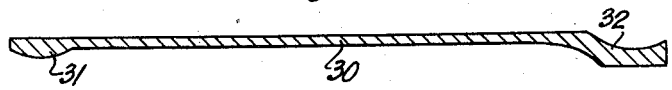
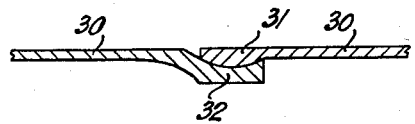
Inventor:
Sydney Charles Hart-Still;
By his attorneys,
Baldwin + Wight Patented Dec. 24, 1940

2,225,779

UNITED STATES PATENT OFFICE 2,225,779

AIRCRAFT WING CONSTRUCTION

Sydney Charles Hart-Still, London, England, assignor to Deekay Aircraft Corporation Limited, London, England Application April 22, 1938, Serial No. 203,691
In Great Britain June 21, 1937

4 Claims. (Cl. 244—124)

This application is a continuation in part of the co-pending application Serial No. 156,767 filed on July 31, 1937.

This invention relates to aircraft wing construction.

Aircraft wing structures as known hitherto have been made entirely of wood, or of wood and metal, or of metal. A disadvantage attaching to these better known materials of construction is that they require a protective covering of a different material to proof them against the effects of atmosphere, water, oil, petrol and acids.

The use of wood and metals for aircraft wing structures offers further serious disadvantages during the process of manufacture; for instance, when building a wing structure of either wood or metal, it is necessary first to cut the material to the required shape and dimensions and then for the cut pieces to be assembled to form the various members, which members are in turn re-assembled to form the internal structure of the wing. This internal structure has finally to be covered with fabric or a skin of wood or metal. The cutting of these pieces and the assembly of the members involves much waste material as well as the use of highly specialised skilled labour, whilst considerable expense is entailed to obtain correct alignment of the mechanism or structure by means of jigs and fixtures, for both forming the component members and connecting them together.

Again, when using either wood or metal, particularly for the skin or covering of the wing, it is found that there is difficulty in maintaining the desired shape of the finished structure. In the case of a wood wing this is due to the warping and shrinkage which is always likely to occur in timber, and in the case of a metal wing to the high density of the material involving the use of very thin, and consequently flexible sheets.

Furthermore, in the case of a wing of the stressed-skin type, whether it be made of wood or metal, the structure so formed becomes virtually a one-piece structure and as such is difficult to repair in the event of damage. The renewal entails cutting away beyond the extent of the actual damage, partial rebuilding with newly formed members and patching the outer skin or covering.

It is usual also, for an aircraft wing structure to be examined periodically so that members which have suffered from deterioration through age or fatigue of the material of which it is made, may be replaced. In a wing structure formed in the ordinary way of wood or metal, this can only be carried out with comparative difficulty and expense by the removal of certain parts of the covering and replacement as in the case of a repair. Should the wing structure be formed of any other material, and the construction be such that the wing is in one piece, partial damage means that the whole wing is rendered useless, particularly if the wing is initially formed by a mechanical operation such as by moulding from a plastic material.

Also, in a single piece moulded wing structure the provision which must be made for the withdrawal of cores demands that the internal members, and the shell or top and bottom members, be free of excrescences. This necessitates thicker webs and shell than would otherwise be used since a flat plate has very little resistance to buckling under load, and an uneconomic structure results.

Furthermore, a disadvantage attaching to the moulding of wing structures in one piece, lies in the manufacture of complete moulds and cores for both left hand and right hand components being necessary.

The provision of wires, moulded within the material for the purpose of carrying stresses to the point of support of the wing structure, offers difficulties in respect of locating the said wires during the moulding operation, and also makes necessary the provision of additional attachment through the medium of the actual shell. The inserted wires cannot conveniently be used in themselves as a fixing medium and a break therefore occurs between the initial stress carrying member and the ultimate fixing. The same limitation affects any form of tubular insert in a moulded wing where there is no connection or relationship between the tubular insert and the ultimate fixing or attachment of the wing to the rest of the aircraft structure.

A completely moulded one piece wing structure carries the disadvantage relating to internal inspection whether it be in the manufacturing stages or during or after service on an aircraft, and the development of flaws or weaknesses cannot be easily detected or put right.

The object of the present invention is to avoid all the defects and disadvantages referred to above, and to provide an aircraft wing structure which is made wholly or mainly of a suitable mouldable thermo-hardening plastic material.

According to this invention a wing structure is of the stressed skin type and is formed multicellular with the cells extending spanwise, preferably from wing tip to wing tip, the said cells being divided from one another by thin vertical sheet or plate members made of a suitable mouldable thermo-hardening plastic material and moulded with enlarged sections at the top and bottom, the cells being completed by top and bottom horizontal members also made of such plastic material. Multi-cellular wing structures are, of course, known per se. The cells forming the structure preferably run parallel to one another or may be tapered in width and depth according to the tapering of the wing spanwise in chord and thickness, the vertical members being of such dimensions as to extend the full depth of the aerofoil section, whilst the horizontal members, that is to say the top and bottom members, are curved to form the shape of the aerofoil section required.

Preferably the enlarged sections of the vertical members are moulded continuously along the top and bottom edges of the said vertical members, the said sections preferably being in the form of ribs of semi-circular or bulbous section and being parallel in plan and varying only in depth, whilst the sections may have additional spanwise reinforcement in the form of a tubular insert of a different material.

The vertical members of the cells may also be further reinforced by the provision of suitably spaced vertical reinforcing members moulded in one with the said vertical members.

The plastic material may be a compounded material having as a base a fibrous filler such for example as cellulose fluff, which base is impregnated with a suitable synthetic resin, and which compounded material becomes, upon the application of both heat and pressure, a permanently set or hardened body possessing physical characteristics which enable it to be used for structural purposes. Such a known material is that which bears the trade name of "Pe-Te" in which the fibrous filler is cellulose fluff, and the synthetic resin one of the phenolic class. Any such material is suited to the needs of an aircraft wing structure such as is described herewith.

These materials have the properties of being impervious to oil, petrol, acids etc., are unaffected by atmospheric conditions, have a very low degree of water absorption without any form of proofing operation being required and the necessary degree of strength as compared with its weight.

Such material, moreover, can be easily moulded into any desired shape and can thus be formed into suitable members for an aircraft wing structure without the necessity for skilled labour other than that required in the first instance for the mould production, thereby eliminating the need for cutting, forming and assembling a large number of small pieces. This material, possessing great rigidity and being of low density whereby may be used a greater bulk for a given strength or weight as compared with metals, can be moulded into any desired shape and will remain in that shape indefinitely. This feature causes to be eliminated the need for many assembly jigs such as would be required if a material of greater flexibility were used.

This invention provides a wing construction which may be assembled or dissembled in a short space of time, which allows of inspection of all parts at any time without destroying any part of the structure. It also allows of easy replacement of internal members or outside covering, as an alternative to repair, without involving the use of skilled labour or the waste of any part which remains undamaged.

The invention also provides for the forming of internal members, and covering or skin members, in such a way as to allow of use on either right hand or left hand wing structure thereby reducing the number of component parts and the cost involved.

Furthermore this invention provides a means of using mouldable plastic materials economically in respect of strength and weight, through the provision of integrally formed stiffening ribs or members on the thin sheet vertical or horizontal members which are of minimum thickness, and at the points of natural concentration of stresses, and in continuity with the initial path of those stresses, an efficient and simple means for the attachment of the wing structure to the rest of the aircraft, at the same time eliminating the need for additional or extraneous fittings.

The invention is illustrated in the accompanying drawings in which:

Figure 1 is a plan view of one form of wing construction;

Figure 2 showing the aerofoil section,

Figure 3 being a detailed view of an enlarged section of the vertical members employed in Figure 2.

Figures 4 and 5 are sectional views on the lines 4—4, 5—5 of Figure 3 respectively.

Figure 6 is an aerofoil section of a modified form and

Figures 7 and 8 enlarged sectional views of the leading and trailing edges respectively of the wing shown in Figure 6.

Figure 9 is a view similar to Figure 1 but of a modified form.

Figure 10 shows an enlarged section of one panel forming top and bottom horizontal members and is a section on the line 10—10 Figure 9, whilst Figure 11 is an enlarged section on the line 11—11 Figure 9 and shows two panels forming top and bottom horizontal members matched one to the other by the shaping of the panel edge.

Referring firstly to Figures 1–8 of the drawings the cells 1, here shown as two in number, are formed by vertical members 2 strengthened by fore-and-aft-spaced, spanwise-extending enlarged sections 4 which are formed in one with or moulded with the said members 2 along the top and bottom surfaces thereof. The said sections 4 are provided with spanwise reinforcement in the form of tubular inserts 5 which are formed of any desired material, and which may vary in size and thickness becoming increasingly stronger towards the inner or fixed end of the wing structure, so that they may be used as the means of attaching the wing to the rest of the aircraft structure. As will be seen from Figure 3, the horizontal aerofoil members 3 are connected to the members 2 through the sections 4 by screws 6 which pass through metal plates 7, 8 countersunk in the members 3 and sections 4 respectively. The aerofoil members 3, which are individually separable from the wing structure, are formed with integrally moulded fore-and-aft-spaced, spanwise-extending sections 3$^a$ of increased thickness, the material providing the increased thickness being entirely on the inner and mutually facing surfaces of the aerofoil members 3. The sections 3$^a$ of increased thickness reenforce the aerofoil members and are formed with longitudinally extending seats 3$^b$ which receive the enlarged attaching sections 4 of the vertical members 2.

The members 2 are further reinforced at suitably spaced intervals by means of vertical webs or the like 9 which are formed in one with said members 2 (see Figures 4 and 5). It is found expedient to reinforce the top and bottom members 3 and this is conveniently done by providing strips 10 which may be arranged fore and aft of the cellular construction or spanwise, between the vertical members 2, the strips 10 being in the form of flanges formed in one with and on the inside surface of the horizontal members 3.

The horizontal members 3 may constitute the whole of the skin surface of the wing construction or only a part thereof. As will be seen from Figure 2, the members 3 terminate at the foremost and aftermost vertical members 2 in which case the leading edge portion 11 and trailing edge portion 12 of the wing are built up as separate units in any suitable form of construction and fixedly secured to said members 2, e. g. through suitable hinges (not shown).

In the arrangement shown in Figures 6-8, however, the members 3 extend completely from the leading edge 13 of the wing to the trailing edge 14 thereof, butting at the said edges to form the complete aerofoil section. In this case the top and bottom members 3 are secured together adjacent the leading and trailing edges, e. g. by countersunk screws 15. In this arrangement moreover, the trailing edge portion 12 may either be hinged in the ordinary manner to act as an aileron or the bottom member 3 over the said trailing portion may be hinged to act as a flap 16.

It is preferable further to strengthen the multi-cellular construction by dividing each cell 1 into a number of separate compartments by the provision of one or more partitions 17 running fore and aft of the wing, the partitions being suitably secured to the vertical members 2 and horizontal members 3.

Referring now to Figures 9-11 the same reference numerals have been employed as in Figures 1-8 for parts of the wing construction which are identical.

In Figure 9 the cells do not extend over the whole wing span since the vertical members 2 are of different lengths. The leading member 2 extends throughout the wing span, the remaining members 2 from leading to trailing edge of the wing each being shorter than the one in front of it. The horizontal members, in place of constituting the whole of the skin surface of the wing construction, are formed in a spanwise direction as a series of panels or sheets 30. In order that the said panels or sheets 30 may, when connected to each other, provide a surface which does not interrupt the required aerofoil section, the said panels or sheets 30 are formed as shown in Figures 10 and 11, that is to say at one end, the undersurface of a panel is formed or moulded with a bulbous projection 31 which is adapted to fit into a cup shaped formation 32 provided at the adjoining end of the next panel or sheet 30, each panel being similar to its neighbour. The panels thus formed provide at their joint both a register and a shear resisting joint and are secured together in any convenient manner, e. g. by bolts.

By employing plastic material as above described, the defects of known constructions as set out above are avoided whilst due to the natural finish of the moulded product, and the absence of flaws due to rivetting, no extra filling or polishing is required. Moreover, the joints, between the horizontal and vertical members, and between the panels forming the horizontal members, form a shear resisting device independent of any adhesion.

What I claim is:

1. In an aircraft wing construction of the stressed skin type formed multi-cellular with the cells extending spanwise, a plurality of spanwise-extending, fore-and-aft-spaced thin vertical sheet-like members formed of moulded thermo-hardening plastic material having enlarged attaching sections extending longitudinally of said members and moulded integrally with and at the tops and bottoms of said members, separable top and bottom aerofoil members also of moulded thermo-hardening plastic material having fore-and-after-spaced, spanwise-extending sections of increased thickness moulded integrally therewith and with the material providing the increased thickness being entirely on the respectively inner and mutually facing surfaces of said aerofoil members, said increased thickness sections reenforcing said aerofoil members and being formed with longitudinally extending seats for receiving said attaching sections, and means for securing said aerofoil sections to said vertical sheet-like members.

2. Aircraft wing construction as set forth in claim 1 in which tubular reenforcing inserts extend lengthwise throughout said attaching sections.

3. Aircraft wing construction as set forth in claim 1 in which metal reenforcing inserts extend lengthwise throughout said attaching sections.

4. Aircraft wing construction as set forth in claim 1 in which the moulded plastic material comprises a compound having as a base cellulose flush which base is impregnated with a synthetic resin of the phenolic class.

SYDNEY CHARLES HART-STILL.